United States Patent

[11] 3,567,101

[72] Inventor Uno A. Ranne
　　　　　　　Laval Des Rapides, Quebec, Canada
[21] Appl. No. 713,560
[22] Filed Feb. 23, 1968
[45] Patented Mar. 2, 1971
[73] Assignee The Robert Mitchell Co., Limited
　　　　　　　Montreal, Quebec, Canada
[32] Priority Jan. 2, 1968
[33] 　　　　　Canada
[31] 　　　　　9,003

[54] PRODUCTION OF SPIRALLY WOUND PIPE
　　　8 Claims, 5 Drawing Figs.
[52] U.S. Cl. ........................................... 228/15,
　　　　　　　　　　　　　　　　　　　　　 228/5, 228/17
[51] Int. Cl. ........................................... B23k 1/20
[50] Field of Search ................................ 228/5, 15,
　　　　　　　　　　　　　　　　　　　17; 219/62; 93/80

[56] 　　　　　　　References Cited
　　　　　　　UNITED STATES PATENTS
941,255　11/1909　Jenkins..................　93/80
984,002　2/1911　Jenkins..................　93/80
2,549,032　4/1951　Taylor...................　93/80
2,888,826　6/1959　Barnes et al. ........　93/80

Primary Examiner—John F. Campbell
Assistant Examiner—Robert J. Craig
Attorney—Fetherstonhaugh and Co.

ABSTRACT: Apparatus for forming spirally wound pipes including a cantilever mandrel forming a core having an array of freely rotatable spherical bearings mounted in spaced relation on the periphery thereof to provide a surface on to which a strip of metal is helically fed, and a continuously moving belt forming the strip of metal on the bearings of the mandrel and feeding the formed pipe axially off the mandrel.

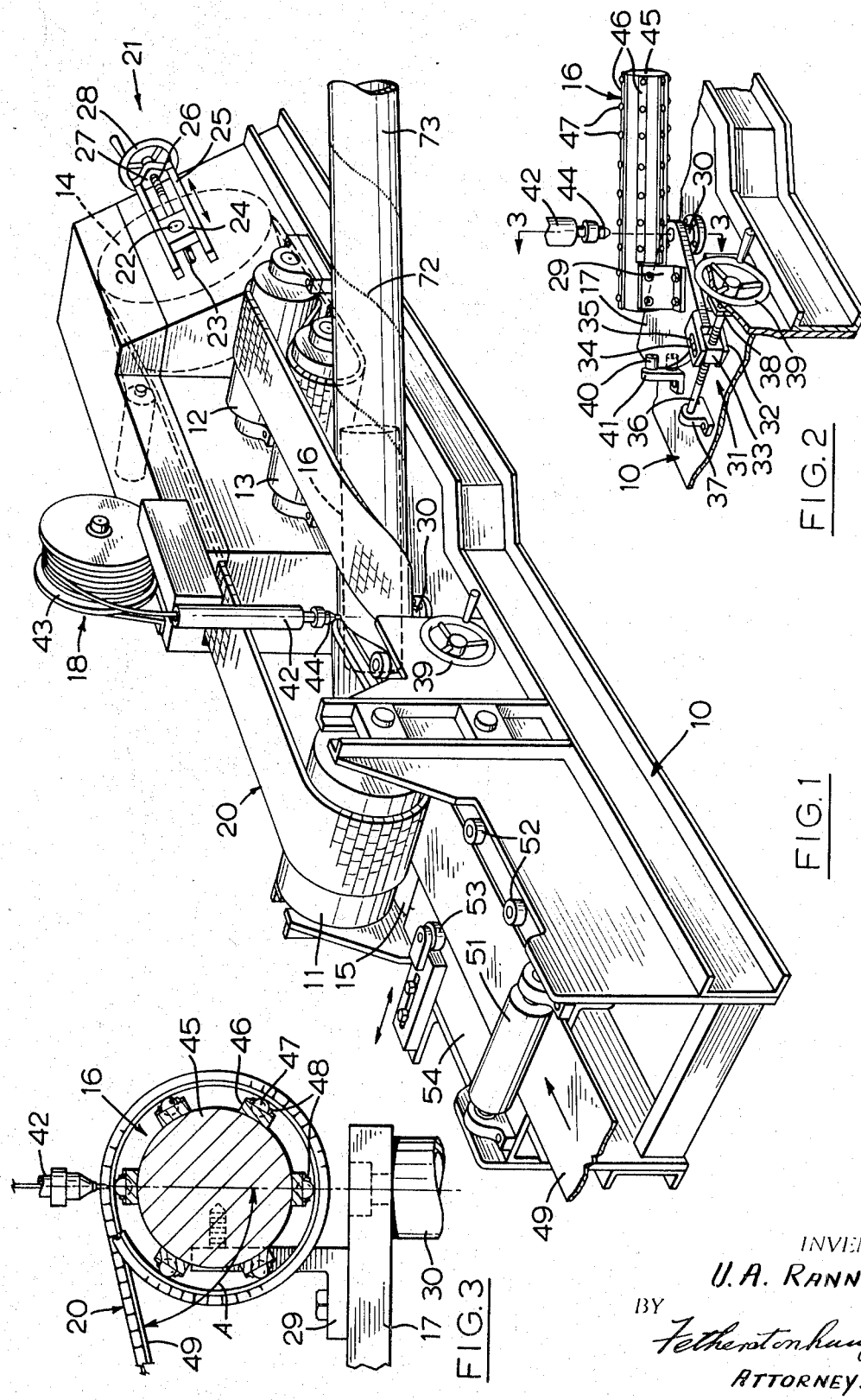

PATENTED MAR 2 1971

INVENTOR.

U. A. RANNE

BY Featherstonhaugh & Co.

ATTORNEYS

PRODUCTION OF SPIRALLY WOUND PIPE

The present invention relates to the production of spirally wound pipes or tubes from a continuous strip of sheet material.

Spirally wound pipes or tubes are produced continuously by passing a strip of sheet material helically around a fixed mandrel and sealing the seam formed by the abutting edges of the strip. This operation satisfactorily produces pipes of certain materials but it scores or marks other materials such as stainless steel or aluminum. Apparatus has been devised to cope with the problem of scoring, such as that shown in Canadian Pat. No. 643,974 issued Jul. 3, 1962 to Dominion Welding Engineering Company Limited, assignee of Thomas C. Stuart, but the apparatus disclosed in that patent copes only with slippage of the sheet material axially along the mandrel and does not meet the problem of scoring by slippage of the sheet material circumferentially about the mandrel as it is being wound.

The present invention overcomes this problem by providing a mandrel with freely movable peripheral means providing a cylindrical locus for a strip of sheet material wound helically around the mandrel.

In its broadest aspect the invention consists, in apparatus for forming a spirally wound pipe from a strip of sheet material, of a cantilever mandrel comprising a core having an array of freely rotatable spherical bearings mounted in spaced relationship on the periphery thereof whereby the strip when urged helically into contact with the bearings is freely movable around the mandrel in a cylindrical locus spaced from the core. Preferably the array of freely rotatable bearings is mounted in a plurality of elongated casings fixed in spaced relationship parallel to the longitudinal axis of the mandrel.

Having overcome the problem of scoring or marking by providing a mandrel presenting a freely movable cylindrical locus for the helically wound strip, it becomes possible to use a belt to wrap the strip rather than forcing the strip through bending rollers or against arcuate walls as now done.

In another aspect the invention consists in an apparatus for continuously forming a spirally wound pipe, comprising: a frame; a mandrel mounted at one end thereof on the frame; means mounted on the frame to feed a continuous strip of sheet material onto the mandrel; a freely movable contact surface on the mandrel; means mounted on the frame to wind the strip spirally around the mandrel to form a pipe, the winding means comprising a belt overlying the strip and spirally circumscribing the mandrel at least one turn; and means to weld the tube at the spiral seam formed by the winding operation. Preferably the belt is endless and is fed with the strip by at least one roller, the belt passing over the roller to overlie the strip, and means to drive the roller.

Another problem in forming spirally wound pipe is that the mandrel must be fixed accurately at an oblique angle to the direction of movement of the strip material in order to provide a substantially uniform seam. Even with an accurate setting of the mandrel a uniform seam is difficult to achieve because of minor lateral movement of the strip as it travels to the mandrel and because of slight variations in the width of the strip.

The present invention overcomes this problem by providing a mandrel which is adjustable to vary the oblique angle between it and the direction of movement of the strip as the pipe is being spirally wound and the seam sealed.

To achieve this result the invention also resides in a method of forming a spirally wound pipe, comprising: advancing a continuous strip of sheet material tangentially across a cantilevered mandrel having its longitudinal axis positioned at an oblique angle with respect to the line of advancement of the strip; wrapping the strip around the mandrel to form a tube having a continuous helical seam; welding the seam at the point of initial contact of the strip with the mandrel; and pivotally adjusting the mandrel about a transverse axis thereof passing through the weld point whereby said angle is varied and the abutting relationship between the edges of the seam is maintained laterally substantially uniform. The invention also resides in a apparatus to carry out this method.

Example embodiments of the invention are shown in the accompanying drawings in which:

FIG. 1 is a view in perspective of apparatus showing formation of continuous spirally wound pipe;

FIG. 2 is a fragmentary view in perspective showing the mandrel of the apparatus in FIG. 1;

FIG. 3 is a cross section taken along the line 3—3 of FIG. 2 showing a portion of the spirally wound pipe and overlying belt;

Figure 4:
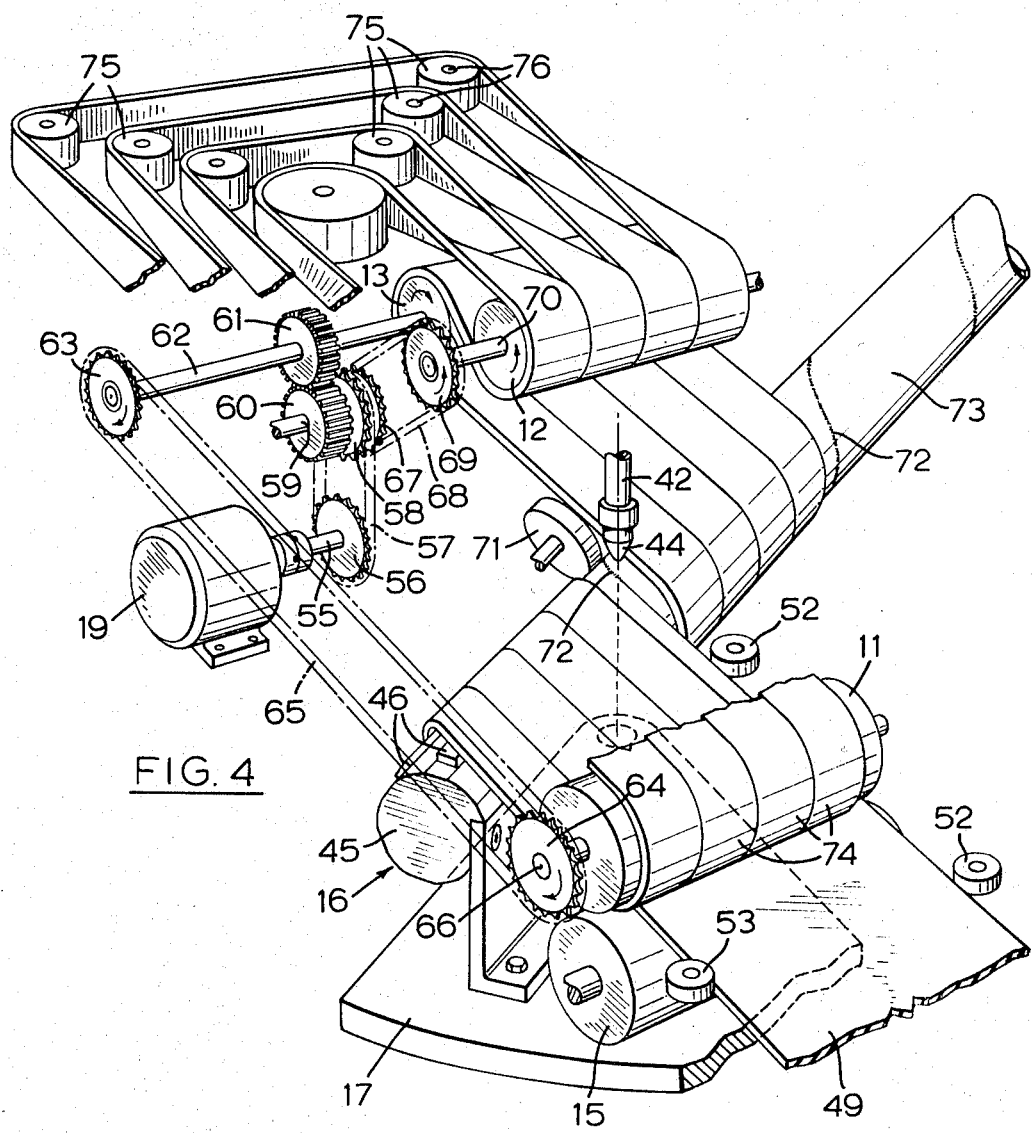
FIG. 4 is a view in perspective, partly broken away, showing an alternate belt arrangement.

The embodiment of the apparatus shown generally in FIG. 1 of the drawings consists of a frame 10 journally supporting a plurality of belt rollers 11, 12, 13 and 14, and a pinch roller 15 cooperating with belt roller 11. Frame 10 also supports a stationary mandrel 16 mounted obliquely to rollers 11 and 15 on a movable segmental platform 17, a welding apparatus 18 mounted above the mandrel, and a drive motor 19 (see FIG. 4).

An endless belt 20 passes around roller 11, forms a complete helical loop about mandrel 16, loops over roller 12 and then back over roller 13, passes under both rollers 13 and 12 and thence around roller 14 back to roller 11. The longitudinal axis of mandrel 16 is positioned at an oblique angle to the axes of rollers 11 and 12, thereby allowing a complete helical turn of belt 20 around the mandrel. This helical turn displaces belt 20 laterally and consequently roller 14 is inclined to return the belt to a path tangential to roller 11.

Roller 14 is coupled with a tensioning apparatus 21 to maintain a desired pull on belt 20. In tensioning apparatus 21, each end of axle 22 of roller 14 (only one end of the axle being shown in FIG. 1) moves laterally in a slot 23 in frame 10 and is journaled in a block 24 which slides in a pair of guides 25 fixed parallel to the slot. Block 24 is freely engaged by a rod 26 which is threaded through a fixed abutment 27 and carries a wheel 28.

Mandrel 16 is fixed by a flange 29 to segmental platform 17 which in turn is fixed at its apex to an upstanding post 30 journally mounted in frame 10. Platform 17 is coupled with an adjusting apparatus 31 consisting of a yoke 32 which is fixed at one corner of the arcuate rim of the platform and which carries a screw block 33 freely pivotal in the yoke about a vertical pin 34 sliding horizontally in slots 35 in the yoke. Threaded through block 33 is a rod 36 journaled in bearing mounts 37 and 38 fixed on frame 10, and carrying an adjustment wheel 39. The arcuate rim of platform 17 is supported remote from yoke 32 by a pair of guide rollers 40 laterally journaled on a bracket 41 mounted on frame 10.

Welding apparatus 18, fixed to frame 10 above mandrel 16, consists of a downwardly projecting elongated torch 42 fed by a journaled spool 43 of welding material. Tip 44 of torch 42 terminates adjacent mandrel 16 while the longitudinal axis of the torch is coextensive with the longitudinal axis of post 30 about which platform 17 rotates, as shown more particularly in FIGS. 2 and 3 of the drawings.

Mandrel 16, shown in detail in FIGS. 2 and 3 of the drawings, consists of a cylindrical core 45 having equally spaced about its periphery a plurality of elongated bearing cases 46 parallel to the longitudinal axis of the core. Freely journaled in each casing 46 are a series of equally spaced ball bearings 47 each held in the casing by a retainer ring 48. Thus mandrel 16 is studded about its periphery with an array of freely rotatable bearings 47 presenting a cylindrical locus spaced form core 45.

To guide a strip of sheet material 49 fed into the apparatus between rollers 11 and 15, frame 10 also carries a journaled guide roller 51, journaled edge rollers 52, and a further journaled edge roller 53 which is laterally adjustable to accommodate strips of varying widths. A table 54 supports strip 49 in its passage beneath guide roller 51 and between edge rollers 52 and 53.

As shown in FIG. 4 of the drawings, rollers 11, 12 and 13 are driven synchronously by motor 19. Drive shaft 55 of motor 19 carries a sprocket 56 connected by a chain 57 with a further sprocket 58 fixed on a journaled shaft 59. Also mounted on shaft 59 is a spur gear 60 which meshes with a companion gear 61 fixed on a journaled axle 62 of roller 13. Axle 62 also carries a fixed sprocket 63 connected by a chain 65 with a sprocket 64 which is fixed on axle 66 of roller 11. An additional sprocket 67 fixed on shaft 59 is connected by a chain 68 with a sprocket 69 fixed on axle 70 of roller 12.

As will be seen in FIG. 4 of the drawings, a narrow roller 71, journaled on frame 10 (not shown), bears, adjacent nozzle 44 of welding torch 42, against the helical seam 72 of a pipe 73 produced by the apparatus. FIG. 4 also shows a variation of belt 20 which, for the production of larger diameter pipes, is replaced by a plurality of narrower, coplanar belts 74. To guide belts 74, inclined roller 14 is replaced by a plurality of rollers 75 each having a vertical axle 76 freely journaled in frame 10. It will be seen from FIG. 4 that in order to accommodate belts 74 on rollers 75 the configuration of the belts about rollers 12 and 13 is reversed from that shown in FIG. 1.

Figure 5:
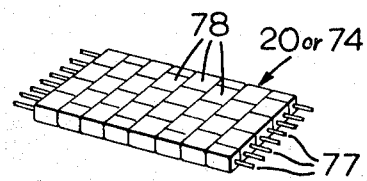
FIG. 5 is a fragmentary view in perspective showing a portion of a belt suitable for use in the apparatus.

Belt 20, or belts 74, may be made of any suitable material. FIG. 5 of the drawings shows a belt 20 or 74 of preferred construction having a plurality of parallel wires 77, pairs of wires being linked laterally by blocks 78 to form a chain belt. The width of belt 20, or the total width of belts 74, is less than the width of strip 49 to allow clearance between the sections of the belt convoluted about mandrel 16 and pipe 50 for welding seam 77 of the pipe.

In the operation of the embodiment of the invention shown in the drawings, a continuous strip of pipe-forming sheet material 49 is fed onto table 54 under guide roller 51 and between edge rollers 52 and 53, and enters the nip between rollers 11 and 15 together with endless belt 20 (or belts 74) which travels around drive roller 11 to register with and overlie the strip. Strip 49 then passes helically with overlying belt 20 around mandrel 16, following the cylindrical locus presented by ball bearings 47, to form continuous pipe 73 while the belt separates tangentially from the pipe to continue its travel around rollers 12 and 13. Nozzle 44 of welding torch 42 is positioned directly over seam 72, i.e. in line with the edge of strip 49. Strip 49 meets mandrel 16 at an acute angle A to the coextensive axes of post 30 and torch 42, as shown in FIG. 3 of the drawings. Angle A is preferably about 75°. This locates the weld point adjacent but slightly beyond the point of initial contact of strip 49 with mandrel 16, thus allowing the strip to align itself properly with its adjacent convoluted portion and produce a good weld. Torch 42 is fed from spool 43 and seam 72 is continuously welded as strip 49 advances tangentially onto the mandrel and pipe 73 passes axially from the mandrel in a direction lateral to the direction of movement of the strip. Roller 71 ensures that the convolutions of strip 49 are coplanar while seam 72 is being welded, to maintain the diameter of pipe 73 constant.

It will be noted again that the longitudinal axis of mandrel 16 is located at an oblique angle to the direction of feed of strip 49 in order to obtain a spiral configuration of the strip to produce pipe 73. It should be noted that while the longitudinal axis of mandrel 16 does not intersect the longitudinal centerline line of strip 49, for the purposes of the present invention the two lines may be considered as intersecting when viewed along a line normal to parallel planes through the two axes. To obtain a constant abutment of the convoluted edge of strip 49 forming spiral seam 72, platform 17 is adjustable through wheel 39 to alter the angle of mandrel 16 with respect to the direction of feed of strip 49. By turning wheel 39, block 33 is moved along rod 36 and the interaction of the rod with yoke 32 rotates platform 17 about the axis of post 30. A skilled operator of the apparatus will sense any required angular adjustment of mandrel 16 by either excessive pressure or excessive laxity in the pressure between the abutting edges of convoluted strip 49 forming seam 72 of pipe 73 which is transmitted to wheel 39. Since the axis of torch 42 is coextensive with the axis of post 30, the relationship between seam 72 and nozzle 44 of the torch is not altered by the angular adjustment of mandrel 16.

Mandrel 16 is especially constructed to prevent scoring or marking of strip 49 as it passes around the stationary mandrel to form spiral pipe 73. As strip 49 is helically wound around mandrel 16 by belt 20 (or belts 74) it contacts only ball bearings 47 carried by casings 46 on the mandrel. Since bearings 47 are freely rotatable they provide a discontinuous moving surface for strip 49. The number of elongated casings 46 needed to ensure the production of a substantially circular pipe 73 is dependent on the gauge or thickness of strip 49 being wound on mandrel 16; the heavier the gauge of the strip, the less number of bearings necessary. For a particularly heavy gauge strip 49 only four elongated casings 46 may be necessary, one located in each quadrant of the circumference of core 45 of mandrel 16. It will be appreciated that core 45 of mandrel 16 need not be cylindrical but may be polygonal in circumference to facilitate the attachment of casings 46.

To achieve a proper tension on belt 20 and maintain its centering on drive rollers 11, 12 and 13, guide roller 14 is adjustable in its plane of rotation. By turning each adjustment wheel 28, threaded rod 26 moves axially in abutment 27 and this action moves block 24 along guides 25. Since blocks 24 carry axle 22 of roller 14 sliding in slot 23, belt 20 is tensioned or slackened according to the direction of rotation of adjustment wheels 28, one of which is connected with axle 22 on each side of the guide roller. A similar adjustment of each belt 74 shown in FIG. 4 of the drawings gives a more uniform pressure of the multiple belts against mandrel 16 and drive rollers 11, and 12 and 13 since the tension in each belt may be separately regulated.

It will be seen that the invention provides an improved method and apparatus for producing a spirally wound pipe 73 since the oblique angle of mandrel 16 with respect to the direction of movement of strip 49 is adjustable to maintain a substantially constant pressure of abutment of convoluted edges of the strip forming seam 72 of the pipe. Of course in place of adjustment wheel 39 automatic means could be connected with rod 36 to replace an operator and hydraulic means have been found suitable. Hydraulic means have also been found suitable to actuate tensioning apparatus 21. The circumferential structure of mandrel 16 facilitates this adjustment by providing for free movement of strip 49 in any direction along its surface in contact with the mandrel, as well as allowing the convoluted strip to move freely around and along the mandrel without scoring or marking the internal surface of resultant pipe 73.

I claim:

1. Apparatus for continuously forming a spirally wound welded metal pipe, comprising: a frame; a mandrel mounted at one end thereof on the frame; means mounted on the frame to feed a continuous strip of sheet material onto the mandrel at an angle oblique to the line of advancement of the strip; means mounted on the frame to wind the strip helically around the mandrel to form a spiral pipe; means to weld the tube adjacent the point of initial contact of the strip with the mandrel; and means to adjust the mandrel pivotally about an axis transverse to the longitudinal axis thereof and passing through the weld point whereby a uniform relationship between the abutting edges of the seam is maintained.

2. Apparatus as defined in claim 1 in which the mandrel comprises a core having mounted circumferentially thereon an array of freely rotatable bearings adapted to engage the strip in a cylindrical locus in spaced relationship form the core.

3. Apparatus as defined in claim 1 in which the winding means comprises a belt overlying the strip and helically circumscribing the mandrel at least one turn.

4. Apparatus as defined in claim 3 in which the feeding means comprises at least one roller having the strip passing tangentially thereagainst, the belt passing over the roller to overlie the strip, and means to drive the roller.

5. Apparatus as defined in claim 3 in which the belt is endless.

6. Apparatus as claimed in claim 3 in which the belt comprises a plurality of individual strips of belting in side-by-side relationship.

7. Apparatus as defined in claim 3 in which the feeding means comprises at least one roller having the strip passing tangentially thereagainst, the belt being continuous and passing over the roller to overlie the strip, the belt being fed off the mandrel onto the a further plurality of rollers to feed back onto said one roller, and means to drive synchronously said one roller with at least one of said plurality of rollers.

8. Apparatus as defined in claim 7 in which at least one of said rollers is adjustable to vary the tension on the belt.